20

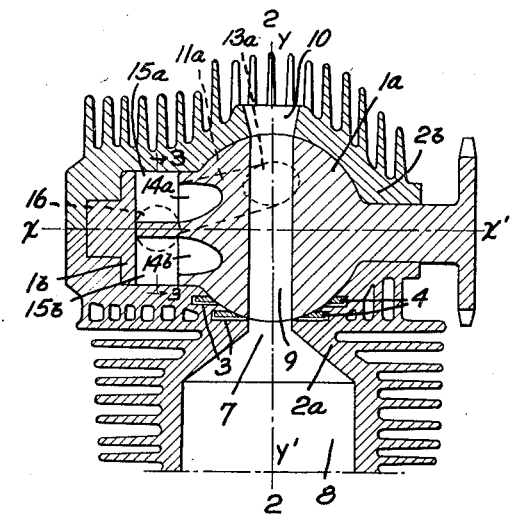
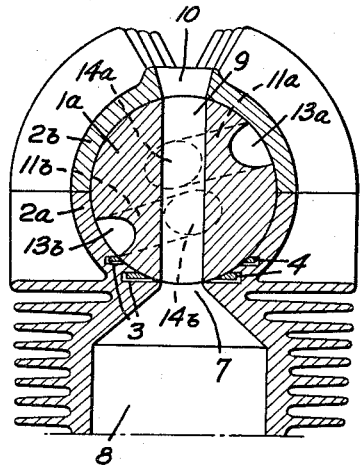
Fig. 1.
Fig. 2.
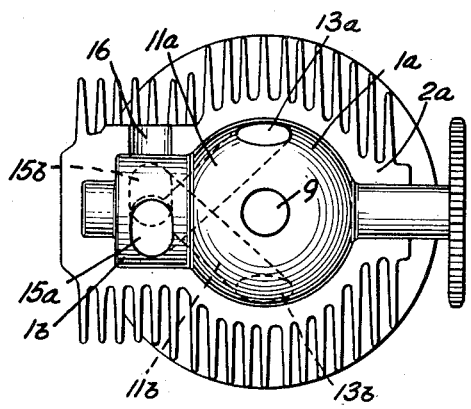
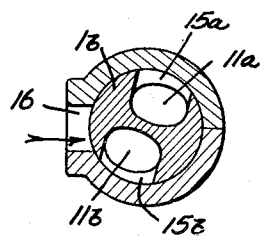
Fig. 4.
Fig. 3.
INVENTOR
Joseph Jean Genet,
BY Karl W. Flocks
ATTORNEY

United States Patent Office 2,787,988
Patented Apr. 9, 1957

2,787,988

DEVICE FOR CONTROLLING THE OPENING AND CLOSING OF THE CYLINDERS OF COMBUSTION ENGINES

Joseph Jean Genet, Paris, France

Original application April 22, 1953, Serial No. 350,429, now Patent No. 2,745,395, dated May 15, 1956. Divided and this application August 18, 1955, Serial No. 529,245

4 Claims. (Cl. 123—80)

The present invention relates to an internal combustion engine and more particularly to a device for closing and opening the inlet and exhaust ports of the cylinder of an internal combustion engine.

The present application is a division of co-pending application Serial No. 350,429, filed April 22, 1953, now Patent No. 2,745,395, entitled Device for Controlling the Opening and Closing of the Cylinders of Combustion Engines.

The device according to the invention is essentially characterized by the fact that it comprises a housing which opens into the chamber of the cylinder and inside which is mounted a valve of spherical shape, which is adapted to be driven, in any suitable manner, with a continuous rotary movement synchronized with that of the engine, and in which are provided ducts which place the cylinder selectively and successively in communication with the inlet and the exhaust of the engine during a predetermined angle of rotation, the fluid-tightness of the closure of the cylinder being obtained by the combination of the use of the spherical shape of the valve with the use of packing rings inserted in grooves provided in the portion of the housing which is secured to the cylinder head.

An object of the present invention is to provide a rotary valve actuated by a shaft which is secured thereto and which is adapted to rest on suitable recesses which form bearings and which are provided in the housing along the axis of rotation of the valve.

Another object of the present invention is to provide a spherical type of distributor valve rotating inside a housing constituted by at least two parts, one of which is integral with the engine head and the fluid tightness of which is insured by means of sealing rings placed concentrically in relation to the communication orifice of the engine cylinder within grooves formed in the part of the housing integral with the head.

Other objects and the nature and advantages of the instant invention will be apparent from the following description taken in conjunction with the accompanying drawings, wherein:

Fig. 1 is an axial longitudinal section of the rotary valve embodied in the present invention for use in an air-cooled single cylinder engine;

Fig. 2 is a section taken along the line 2—2 of Fig. 1;

Fig. 3 is a section taken along the line 3—3 of Fig. 1; and

Fig. 4 is a plan view of the rotary valve illustrated in Fig. 1.

Referring now to Figs. 1–4, the rotary valve embodied in the present invention is illustrated, showing in particular the special design of the inlet and exhaust ducts. According to the embodiment shown by way of example in the drawings, the rotary valve is a metallic mass and comprises a spherical part 1a and a cylindrically shaped extension 1b, the whole rotating within a two-part housing 2a and 2b, one part 2a being integral with a cylinder 8. It is in this latter part of the housing that are provided the grooves 4 containing the rings 3 concentric with the communication orifice 7. An exhaust duct 10, which, in the example shown, is cylindrical and rectilinear, is arranged in a plane perpendicular to the axis of rotation XX' of the rotary valve; it allows the cylinder 8 to be connected with the exhaust duct 10, through the communication orifice 7 provided in the cylinder 8. In the example shown, this connection with the exhaust takes place when the exhaust duct 9 is in the YY' axis of the cylinder 8, the said condition being realized when the axis of rotation of the rotary valve is perpendicular to the axis YY' of the cylinder 8 and intersects the extension of the said axis. By this specific arrangement, the cylinder 8 is put in communication with the fixed exhaust duct 10 twice for each complete rotation of the distributor and so that the distribution is effected for two engine cycles.

In view of this last consequence, there are provided in the body of the rotary valve two preferably rectilinear and cylindrical inlet ducts 11a and 11b which are arranged symmetrically in relation to the axis of rotation XX' of the distributor and offset at an angle of 180°, one with respect to the other. Two of the ends 13a and 13b of the said ducts issue along the great circle of the sphere 1a, which is contained in a plane perpendicular to the axis of rotation XX' and along which also issue the openings of the exhaust duct 9, the spaces between the openings of the exhaust ducts and the inlet ducts being determined in terms of the engine setting. The other ends 14a and 14b of the ducts 11a and 11b issue into ducts 15a and 15b provided in the cylindrical part 1b of the rotary valve, symmetrically relative to the axis of rotation XX'. The said ducts 15a and 15b during the rotation of the rotary valve, come successively opposite the fixed inlet orifice 16. The object of this latter arrangement is to render the sperical rotary valve more fluid-tight due to the fact that only one of the ends of the ducts 11a and 11b is situated in the spherical part 1a.

The section of the ducts, both exhaust and inlet, is preferably circular. The diameter thereof is determined by the conditions of adjustment of the engine and, in particular, of the period of time fixed for the inlet and the exhaust. The said ducts may have an oblong section if the adjustment conditions of the engine cannot be carried out with a circular section.

It will at once be seen that when the rotary valve is continuously rotated about its axis XX', it places the cylinder 8 twice per rotation successively in communication with the inlet orifice 16 and the exhaust duct 10 of the engine, through the orifice 7 of the duct 9 and the ducts 11a and 11b.

The result is that, for an explosion engine operating on a four-stroke cycle, it is sufficient to rotate the rotary valve at a quarter of the speed of rotation of the engine crankshaft. For an engine operating on a two-stroke cycle, the rotary valve must rotate half as rapidly as the engine crankshaft.

Moreover, it is obvious that if, for the clearness of the description, there has been described and shown a rotary valve for a single cylinder engine, the invention applies just as well and with the same advantages to multi-cylinder engines.

It will be obvious to those skilled in the art that various changes may be made without departing from the spirit of the invention and, therefore, the invention is not limited to what is shown in the drawings and described in the specification, but only as indicated in the appended claims.

What is claimed is:

1. In a rotary distributor for an internal combustion engine of the known type having a rotating shaft, a spherical-shaped distributor body disposed within a housing having a fixed exhaust duct and a fixed inlet duct, an orifice formed in said housing and communicating with the engine cylinder, in which rotary distributor the distributor body is rotatable in a continuous movement synchronized with the rotary movement of the engine shaft, said distributor body having an exhaust duct arranged perpendicularly to the axis of rotation of said distributor body, the centers of both ends of said exhaust duct being located in a plane extending through said spherical-shaped body and adapted to cause said orifice and end of the fixed exhaust duct to communicate, two inlet ducts formed in said distributor body arranged symmetrically relative to the axis of rotation of said distributor body and offset one with respect to the other by an angle of 180°, the center of one of the ends of each of said inlet ducts lying in a plane which includes the centers of both ends of the exhaust duct of said distributor body and offset relative to the ends of said exhaust duct, the center of the other end of each of said inlet ducts disposed in a plane parallel with said plane which includes the centers of both ends of said exhaust duct, so that it causes communication between said orifice and the fixed inlet duct, said inlet and exhaust ducts of the distributor body placing the cylinder of the motor selectively and alternately in communication with the fixed exhaust duct on the one hand and with the fixed inlet duct on the other hand by means of the orifice communicating with the engine cylinder.

2. In a rotary distributor for an internal combustion engine of the known type having a rotating shaft, a spherical-shaped distributor body disposed within a housing having a fixed exhaust duct and a fixed inlet duct, an orifice formed in said housing and communicating with the engine cylinder, in which rotary distributor the distributor body is rotatable in a continuous movement synchronized with the rotary movement of the engine shaft, said distributor body having a spherical portion and a cylindrical extension, said spherical portion having a rectilinear exhaust duct formed therein and arranged perpendicularly to the axis of rotation of said distributor body, the centers of both ends of said exhaust duct being located in a plane extending through said spherical portion and adapted to cause said orifice and an end of the fixed exhaust duct to communicate, said distributor body having two rectilinear inlet ducts formed therein and arranged symmetrically relative to the axis of rotation of said distributor body and offset one with respect to the other by an angle of 180°, the center of one of the ends of each of said inlet ducts lying in a plane which includes the centers of both ends of said exhaust duct formed in said spherical portion of said distributor body and offset relative to the ends of said exhaust duct, the center of the other end of each of said inlet ducts communicating with an inlet conduit located in a plane extending through said cylindrical extension and arranged perpendicularly to the axis of rotation of said distributor body, said inlet conduit being adapted to communicate with said fixed inlet duct, so that it causes communication between said orifice and the fixed inlet duct, said inlet and exhaust ducts of the distributor body placing the cylinder of the motor selectively and alternately in communication with the fixed exhaust duct on the one hand and with the fixed inlet duct on the other hand by means of the orifice communicating with the engine cylinder.

3. In a valve, a housing having a communication orifice formed therein, a rotary member disposed in said housing having a spherical portion and a cylindrical extension, said spherical portion having a rectilinear exhaust duct formed therein and arranged perpendicularly to the axis of rotation of said rotary member, the ends of said exhaust duct being located along the periphery of said spherical portion and adapted to communicate with said communication orifice, said rotary member having inlet ducts formed therein and arranged symmetrically with respect to the axis of rotation of said rotary member, each of said inlet ducts having the center of one end lying in a plane which includes the centers of the ends of said exhaust duct of said spherical portion and offset relative to the ends of said exhaust duct and adapted to communicate with said communication orifice, the center of the other end of each of said inlet ducts communicating with an inlet conduit the axis of which is located in a plane extending through said cylindrical extension and arranged perpendicularly to the axis of rotation of said rotary member, said inlet conduit being adapted to communicate with a fixed inlet orifice, whereupon rotation of said rotary member causes successive communication of said inlet conduit with said inlet orifice and thereafter affording successive communication of said inlet ducts and exhaust duct with said communication orifice.

4. Device according to claim 1, in which the distributor body comprises a spherical-shaped part and a cylindrical extension in which is arranged one of the ends of each of the inlet ducts.

References Cited in the file of this patent

UNITED STATES PATENTS

| | | |
|---|---|---|
| 298,063 | Bogert | May 6, 1884 |
| 1,128,757 | Chandler | Feb. 16, 1915 |
| 1,808,671 | Luyckx | June 2, 1931 |

FOREIGN PATENTS

| | | |
|---|---|---|
| 454,938 | France | May 8, 1913 |